US009849387B1

(12) United States Patent
Johnson et al.

(10) Patent No.: US 9,849,387 B1
(45) Date of Patent: Dec. 26, 2017

(54) INTERPRETATION OF USER DEVICE INPUTS

(71) Applicant: Amazon Technologies, Inc., Seattle, WA (US)

(72) Inventors: Brett Ethan Johnson, Woodinville, WA (US); Nicholas Joshua Lawson, Irvine, CA (US); Matthew James Van Gorder, Redmond, WA (US); Robert Duane Rost, Seattle, WA (US); Eadan Bloch, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 365 days.

(21) Appl. No.: 14/568,072

(22) Filed: Dec. 11, 2014

(51) Int. Cl.
A63F 9/24 (2006.01)
A63F 13/65 (2014.01)
A63F 13/56 (2014.01)

(52) U.S. Cl.
CPC .............. *A63F 13/65* (2014.09); *A63F 13/56* (2014.09)

(58) Field of Classification Search
None
See application file for complete search history.

(56) References Cited

U.S. PATENT DOCUMENTS

| 2004/0127284 | A1* | 7/2004 | Walker | G07F 17/32 463/30 |
| 2006/0258422 | A1* | 11/2006 | Walker | G07F 17/32 463/7 |
| 2007/0032288 | A1* | 2/2007 | Nelson | G07F 17/32 463/16 |
| 2007/0066403 | A1* | 3/2007 | Conkwright | A63F 13/10 463/43 |
| 2008/0300055 | A1* | 12/2008 | Lutnick | G07F 17/3209 463/39 |
| 2008/0318656 | A1* | 12/2008 | Walker | G07F 17/32 463/20 |
| 2011/0053173 | A1* | 3/2011 | Hood | G07F 17/32 435/7.1 |
| 2011/0223983 | A1* | 9/2011 | Schwartz | G07F 17/3211 463/17 |
| 2012/0135799 | A1* | 5/2012 | Okada | G07F 17/32 463/25 |
| 2012/0202580 | A1* | 8/2012 | Ursic | G07F 17/32 463/20 |
| 2013/0023337 | A1* | 1/2013 | Bowers | G07F 17/32 463/25 |

\* cited by examiner

*Primary Examiner* — Paul A D'Agostino
(74) *Attorney, Agent, or Firm* — Baker & Hostetler LLP

(57) ABSTRACT

Measurement data is correlated to one or more probable user states. The measurement data is associated with a user of the computing device and received from sensors communicatively coupled to the computing device. Execution of an application running on the computing device is altered based on the probable user states. In another embodiment, probable user states for a user of a computing device are processed. The probable user states are indicative of a level or type of interaction of the user with the computing device. The probable user states are also determined based on analysis of measurement data received from sensors communicatively coupled to the computing device. Indications of the probable user states are provided during execution of an online application on a second computing device.

20 Claims, 8 Drawing Sheets

INTERPRETATION OF USER DEVICE INPUTS

BACKGROUND

Mobile electronics devices, such as smartphones, may be used globally across a plurality of networks. The spread of accessible data networks have enabled mobile device users to remain connected to their provider networks and thus all of the data and services available via the Internet and other networks. Such devices typically host a variety of applications, such as video and audio applications, image capture devices, and location determination systems, such as GPS. Mobile electronics devices are also equipped with a variety of sensors capable of extracting information about the environment. Such sensors can include accelerometers, cameras, and biometric sensors.

DETAILED DESCRIPTION

Figure 1:
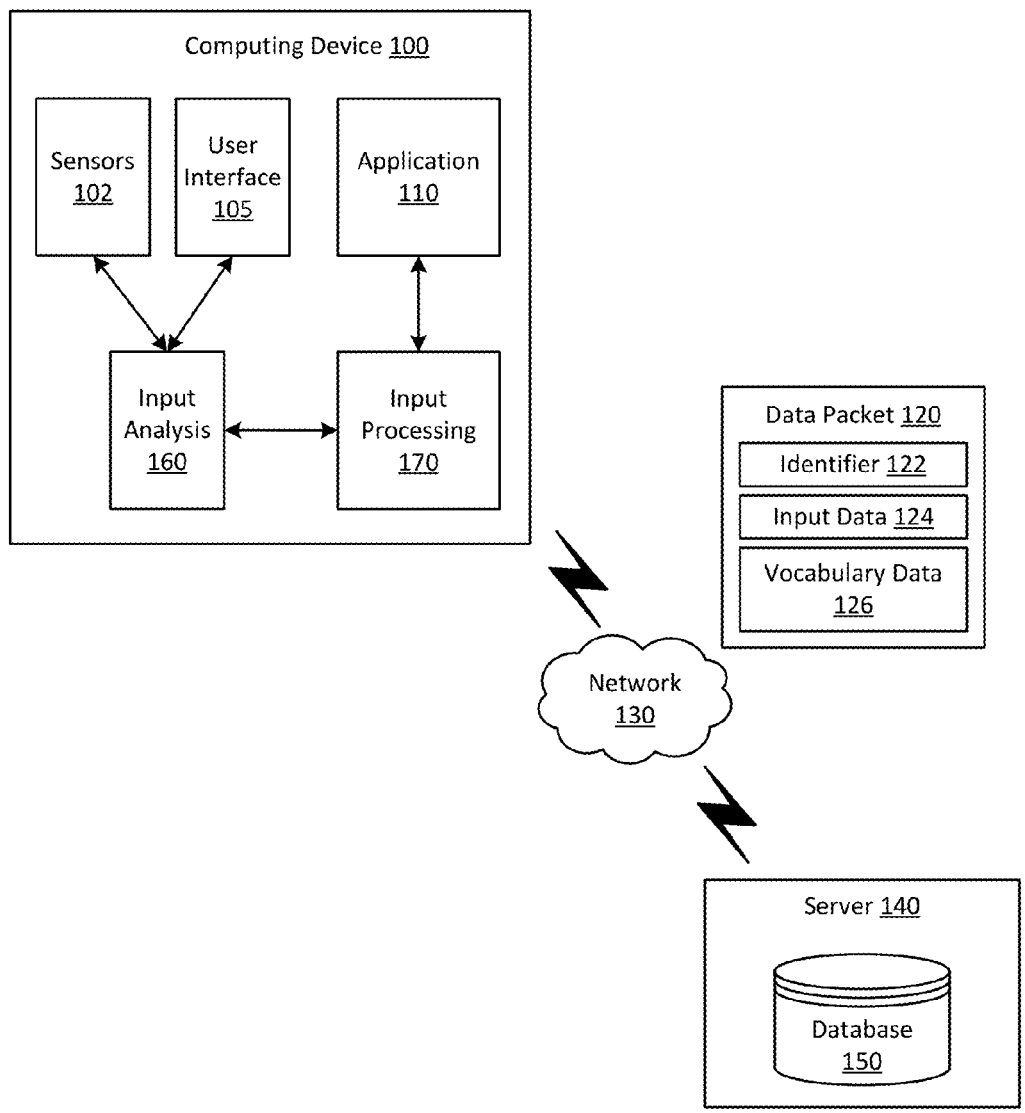
FIG. 1 is a diagram illustrating a user feedback mechanism in accordance with the present disclosure.

Many mobile device applications can benefit from receiving data that can provide indications of the user's environment and the user's level or type of engagement with the device. Some applications receive direct intentional input from the user. For example, an application can request, via the user interface, direct feedback from the user. As another example, an application on the device can determine that the user is actively entering input into the device by detecting activity on the touchscreen. However, additional features and services can be provided by receiving one or more inputs from various input devices and sensors on the device that are interpreted to ascertain the user's state and environment. Such inputs can be used to infer a user's state without directly soliciting direct user feedback to ascertain the user's intent. Described herein are various embodiments for implementing a non-verbal feedback service that allows devices and applications running on the devices to provide context-sensitive services and features. In some embodiments, a local system level service may execute on a user device to aggregate inputs from various sensors, such as cameras, accelerometers, and gyroscopes. The service may process the inputs and tracks the inputs over time. The information may be provided to applications and other users. In this way, upon approval by a user, aspects of the user's interactions with their environment can be aggregated into useful data about the user's interactive state, and any application can subscribe to the receive information pertaining to the user's interactive state in order to provide a response within the context of the application.

Many user actions can be indicative of a user's interactive state (which may also be referred to as the user state), some of which may not be directly input into the device by the user. For example, such indirect inputs may include motions made by the user, sounds made by the user, posture of the user, body temperature, eye dilation, sweating, voice volume elevation, pitch, non-verbal sounds, and so forth. Such indirect inputs may also be referred to as collateral inputs, secondary inputs, or unintentional inputs. While some inputs may result from optical or visual input devices, such as a camera, many unintentional inputs may be detected by non-visual or non-optical sensors, such as motion sensors, audio sensors, and biometric sensors.

For example, during execution of a game application, when a user holds a device close to the user's face with a determined level of rigidity, the game application may assume that the user is engaged in an intense experience. With this information, the game application can adjust the play of a game scenario, such as decreasing the speed of play to relax the player if it is determined that the player is in an intense state. As another example, when it is determined that a user is holding the device at a less than parallel angle, it can be assumed that the user is in a more casual position. The game application game may leverage this information to slow or increase a game's pacing depending on the design's intended result.

Other examples of user inputs that can be sensed by a device include device orientation, vocal and other sounds, physical movement patterns, the device's proximity to the user's face, and the user's facial expressions. The sensed user inputs can be used to develop a user input vocabulary that can be provided to applications, which can in turn then respond based on the information.

In networked applications, such as when users are interacting with an online gaming service, sensor inputs from multiple users can be used to allow multi-user applications to adjust the user experience based on the user input vocabulary received from the multiple users. For example, online platforms that provide video gaming applications for one or more players as well as other applications, such as broadcast and other media services, may receive sensor input feedback from users using a user input vocabulary. The online platform may adjust the behavior of the user applications based on the received input. Furthermore, during multiplayer game sessions, individual players may be provided with user responses for competing players.

The user input vocabulary can be generated using any number of sensors and other input devices that may be provided on a user device. Such inputs may include, for example:

Phone orientation;

Camera (e.g., capture of facial expression, distance from screen, etc.);

User posture (e.g., sitting casually, leaning in to the device, etc.); and

Audio inputs from a microphone (e.g., power level and frequencies of sensed audio input).

In an embodiment, a user input analysis function can be provided that is configured to receive raw user input data and determined user input vocabulary that can be used by applications. The user input analysis function can receive sensor inputs and process and analyze the inputs to generate data that can be interpreted to infer the user's state. Such data can include, for example, the user's facial position in millimeters in three dimensional coordinates, and the orientation of the device in degrees for three axes (e.g., pitch, roll, and yaw). The data can also include how often the user is looking at a screen, whether the user is blinking, and how close the user's face is to the device. The audio inputs can be analyzed to determine the spectral content of the user's voice to ascertain user responses, such as surprise, frustration, and anger.

In some embodiments, the user device may also be provided with a user input processing function that is not specific to any particular application and is configured to implement actions on the device based on the user input vocabulary. Based on the determined user input vocabulary, player engagement with the device and a currently executing application can be determined. The application and/or the user input processing function can then respond to the input. For example, a video game application can increase or decrease game intensity in order to achieve a desired level of engagement. Additionally, the video game application can pause or slow down the pace of the current game when it is determined that the player appears to be distracted.

In some embodiments, pressure sensors can determine how firmly the user is gripping the device and the force with which the user is tapping on a touch sensitive surface.

In general, a video game application can either allow the user's level of engagement to determine gameplay (i.e., the game behaves in the way that the user wants), or the video game application can allow the user's level of engagement to change the gameplay for the desired engagement (the user behaves in the way that the game wants).

Applications other than video game applications may respond in different ways. For example, the user input processing function can turn off certain active user input controls when it is determined that the user's level of engagement is low or non-existent, to prevent accidental and unintentional user inputs from being entered when the user is not paying attention. As another example, if the user input processing function determines the orientation of the user's head, the user's orientation can be used to control the screen rotation of the display on the user device. The determined orientation of the user's head can be used in lieu of gyroscopes. In some embodiments, the rendering offset for the user display can be changed based on the orientation of the user's head.

Camera and audio sensors can be used to determine the user's current response. For example, the analysis of the user's facial expression and audio inputs can be used to determine if the user is laughing. Some applications may automatically insert, for example, an "LOL" to a current edited message.

Currently, mobile devices typically determine the device's orientation by using gravity-bound sensor inputs, such as those from an accelerometer and gyroscope. However, this method assumes that the user is perpendicular to the ground, that the user is upright, and that the device is subject to a constant gravitational force. If a front-facing or other camera on the device is used to generate input for analyzing the head position of the viewer relative to the device, the orientation of the device relative to the viewer's head position can be determined. The user input analysis function and user input processing function can then adjust the orientation of the user display so that the device can be used while lying down supine, while lying on a side, or while experiencing zero or non-stable gravity conditions. Furthermore, in some embodiments, stationary horizontal screens that re-orient according to the user's orientation and position can be provided. The sensed orientation of a user, such as if the user is off axis, can be used to infer if the user is more likely to be in a casual state or a more rigid or tense state. For example, accelerometer inputs can be used to determine a moving window of the average angle of the device.

As another example, the user's heart rate can be determined through inputs provided by pressure sensors, moisture sensors, heat sensors, or some combination. By monitoring a user's heart rate, video game sequences can be generated that are designed to enhance the user's gaming experience through heart rate variation patterns.

Such biometric information may be used to develop a user input vocabulary that that can be used to provide a number of functions based on inferences about the user's current state. For example, the user input vocabulary can be used to determine frustration levels with users of either new devices or new applications on the devices. The user input processing function, for example, automatically invokes a help function. In general, the user input processing function can also automatically identify user responses and generate automated responses based on the identified responses.

In networked applications, during multiplayer game sessions, individual players may be provided with user responses for competing players. When the user is connected to a network, other types of feedback can be generated and provided to sites and services with which the user is engaged. For example, if a user is viewing products on a website, feedback for the products can be automatically generated. An application marketplace application, for example, may receive feedback regarding users' responses to an application, which may provide more accurate feedback than user ratings. Furthermore, feedback specific for identified points within an application can be provided to improve response.

The user input processing function may be configured to receive inputs from a plurality of inputs and process the inputs. The user input analysis function, for example, can be configured to receive one or more sets of unprocessed sensor inputs and weight the inputs to identify potentially relevant user input vocabulary parameters. Ranges of values can be defined for user states. For example, a user state can be implemented that represents a user's attention level. The attention level can be used to represent the degree to which a user is focused and engaged with an application that is running on the user's device. The attention level may be determined using a combination of sensor inputs that indicate factors such as how much force the user is exerting on the device, the body temperature of the user, and the heart rate of the user. The indication of attention level can then be used to modify or alter the execution of an application to enhance the user's experience such as, for example, increasing the level of difficulty of a game application when a user is deemed to have a higher attention level. In one example, values that are indicative of a user's attention level can range from those corresponding to "no focus" to "highly focused." The levels can be represented by numerical values or other means, which can then be used to represent the attention level as a user state.

Another example implementation of a user state may be the user's postural engagement, which can be used to infer the user's engagement with the device based on a three-dimensional estimate of the user's bodily position in space as well as in relation to the device. For example, sensor inputs may be used to gather acceleration and orientation data of the device which can be analyzed to estimate an orientation of the user as well as the orientation of the device. Based on the analyzed sensor inputs, user state values can be determined that may range, for example, from those corresponding to "relaxed," "lying down," and "highly engaged." The orientation of the device may be used to determine a first estimate of the user's postural engagement. For example, sensor measurement data may be used to determine that the user's device is in a horizontal position and is further oriented sideways. This set of information may correspond to a user state of "lying down." As another example, if the three-dimensional position of the user's device rapidly changes from a first position that has not changed for ten minutes to a three feet positive change in the Z or vertical direction, then this information may correspond to a user state of "standing up." In some embodiments, some user states can be combined to generate yet additional user states. For example, a "standing up" user state can be combined with a "highly focused" user state to yield a "tense" user state. Depending on the application, a visual indication of the user state may be indicated on the user interface of the device or another device if the user is engaged in an interactive application.

In some embodiments, the user input analysis function and the user input processing function may be implemented using probabilistic approaches, such as Bayesian inferencing. Generally, some type of estimation may be incorporated, such as a parametric classification technique. In various embodiments, the user input analysis function and the user input processing function may employ probabilistic methods to match sensor inputs to possible user states. In some embodiments, experience-based techniques, such as expert modeling can be used to match inputs to user states. As an example, Markov modeling or variations thereof (e.g., hidden Markov model and hierarchical hidden Markov model) can be used in some embodiments to identify user states.

These and other aspects and embodiments of the present invention will now be described in greater detail. FIG. 1 illustrates one embodiment of a system for incorporating user feedback on a computing device in accordance with the present disclosure. The system comprises a computing device 100 and a server 140. The computing device 100 may communicate with the server 140 via a communications network 130. The computing device 100 includes an application 110, a user interface 105, and one or more sensors 102. The computing device 100 also includes a for providing computing resources can be. The server 140 includes a database 150 for storing user feedback.

The computing device 100 can be a smart phone, a personal computer, laptop, or any other computing device that includes wired or wireless communication capabilities. The application 110 can be any software application that executes on computing device 100, such as a video game. Application 110 may use user interface 105 to communicate with the user of wireless device 100. The computing device 100 can receive and process user feedback information using user input analysis function 160 and a user input processing function 170. The computing device 100 can also send the information via data packet 120, which may include identifier 122, input data 124, and vocabulary data 126.

The user input analysis function 160 may be configured to receive inputs from the user interface 105 as well as sensors 102. The user input analysis function 160 may be configured to analyze the inputs to generate one or more user states. In one embodiment, the user states may be determined using a weighted combination of the inputs, and correlating the combination various defined user states. The correlations may be context-dependent. For example, a combination of inputs may be correlated to a particular user state in the context of a video game application, while the same combination of inputs may be correlated to a different user state in the context of an e-reader application.

As an illustrative example, during execution of a video game application, the user input analysis function 160 may receive an input that the device is a distance X from the user's face, and another input indicating that the device is being gripped by the user with a force Z. The user input analysis function 160 may generate a weighted combination $f(X,Y)$ that yields a user state $U_{X,Y}$. The user input processing function 170 may be configured to process the determined user state in the context of the active application running on the device. For example, if the device is executing a video game application, the user input processing function 170 may determine, based on the user state, that the user is engaged in an intense user state. With this information, the game application can alter the play of the current game scenario, such as decreasing the speed of play to relax the player if it is determined that the player is in an intense state.

The use of weighted combinations to determine user states is one example implementation of a way that the user input analysis function 160 may determine user states. In another example, candidates for user states can be selected based on biasing to influence the selection. For example, a user state can be determined based on an initial weighting of inputs that indicate relevance of the inputs to the user state. The weighting can be continuously updated to increase the likelihood that the user state is the most accurate user state given the received inputs. Biasing can indicate, for example, that some user inputs are only relevant to certain user states while having no impact on other user states. The biasing can also be used to eliminate some user states from consideration. For example, in some cases the relevance of a particular input may be zero, indicating that the input is non-distinguishing for the user state. In this case a zero weight can be used to indicate that a particular input is unlikely to contribute to a given user state.

In another example, the user input analysis function 160 may implement a pattern classification algorithm to identify relevant user states. For example, the user input analysis function 160 may include a learning function that is configured to continuously learn which inputs are relevant to a particular user state. In some embodiments, probabilistic approaches such as Bayesian inferencing may also be incorporated. Generally, some type of estimation may be incorporated, such as a parametric classification technique. In some embodiments, the user input analysis function 160 may employ probabilistic methods to analyze and identify user states. In order to provide relevant results that are more likely to indicate estimated user states that correlate to an actual user state, the most relevant inputs should be identified and weighted. However, the complexity and diversity of human responses may preclude a deterministic or exhaustive solution. In some embodiments a heuristic model can be used to determine satisfactory solutions that provide an acceptable confidence level in the results. For example, experience-based techniques such as expert modeling can be used to aid initial selection of user states. The heuristic model can probabilistically indicate inputs of likely impact through, for example, tagging various metadata related to a particular input. Feedback from an initial round of analysis can be used to further refine the initial selection, thus implementing a closed loop system that generates likely candidates for user states in situations where programmatic approaches may not yield accurate results. As an example, Markov modeling or variations thereof can be used in some embodiments.

Figure 2:
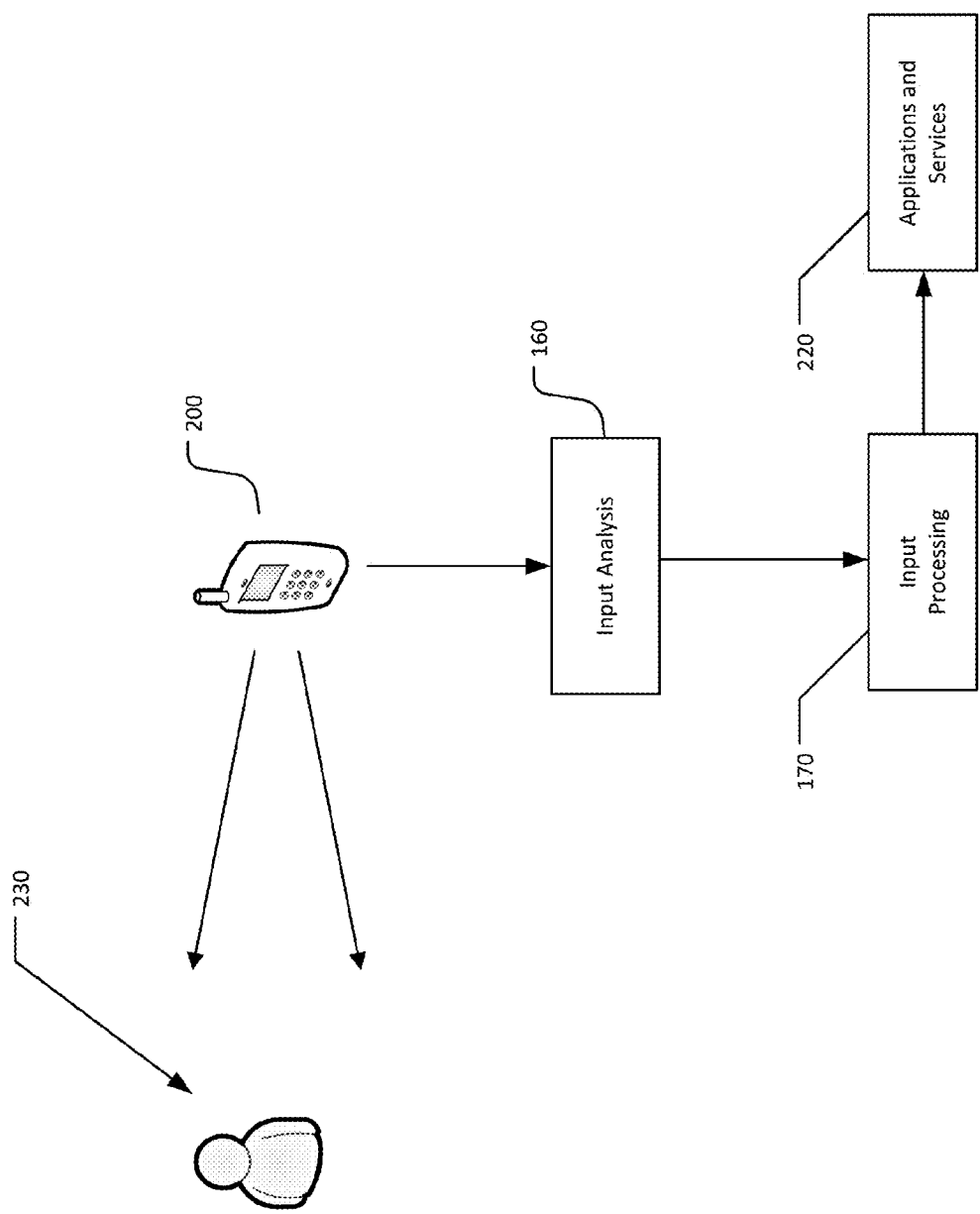
FIG. 2 is a flowchart of one embodiment of a process for providing user feedback in accordance with the present disclosure.

Referring to FIG. 2, illustrated is an example of a device 200 that may include one or more input sensors. The device 200 may be configured to capture various input data pertaining to the state of the user in relation to the device 200, such as image data, pressure data, biometric data, breathing rate, voice volume, non-verbal audio communication, and physical movement of a user 230. The data may be provided to input analysis function 160 for analysis and determination of user states. The device 200 may further provide the user states determined from the input data to input processing function 170 for determining currently running applications and services 220 and applying the determined user states to the applications and services 220.

The user input analysis function 160 and the user input processing function 170 may be configured to operate in real time. The user input analysis function 160 and the user input processing function 170 may thus be configured to execute at a sufficient update rate such that the computing device may be provided feedback regarding a user's state without significant delays, and to provide the user input vocabulary to requesting applications at a sufficient update rate that is useful for real-time and other time sensitive applications. For example, the user input processing function may provide information at least 10 times per second in order to provide a timely feedback.

In order to provide feedback for a user position, the feedback may be determined based on image data, accelerometer data, proximity sensors, and other sensors that are available on the device. For example, the user input processing function 170 may be configured to recognize one or more items within the captured image. For an object, such as a user's face in an image, a plurality of features on the object can be extracted to provide a feature description of the object. Such feature descriptors extracted from an image can then be used to identify the object. An image recognition algorithm may be used to extract feature descriptors and match the extracted features to recognize the image.

The location of a user or a part of a user, such as the user's head or the user's eyes, may be determined using image recognition and other techniques. Such techniques may include traditional or three-dimensional facial recognition and tracking, skin texture analysis, and/or software algorithms designed to detect the position of a user or part(s) of a user from an image or other detected information.

In some embodiments, functions may reside in a user device, such as a smartphone. In other embodiments, the input data may be captured by a user device and transmitted over a network to another system that may provide, for example, user input analysis function 160 and the user input processing function 170

The mobile device may include a location determination function, such as GPS or cellular-based location determination. Location information may also be provided to the user input analysis function 160 and the user input processing function 170. Based on a device's location, additional useful features and services may be provided to the device. In one embodiment, targeted data that may be relevant to the location and local environment may be provided to the device based on the user's current engagement level. It can be further appreciated that once a device's location along with the device's orientation or point-of-view is determined, any number of services may be provided related to the location and orientation.

When a set of inputs fails to be categorized by the user input analysis function 160 and the user input processing function 170, it may be determined that the set of inputs represents a new user response, and the set of inputs may be identified for further analysis. Alternatively, the set of inputs may be correlated with a default interpretation. A machine-learning approach may be taken to further refine the default interpretation based on new data.

Figure 3:
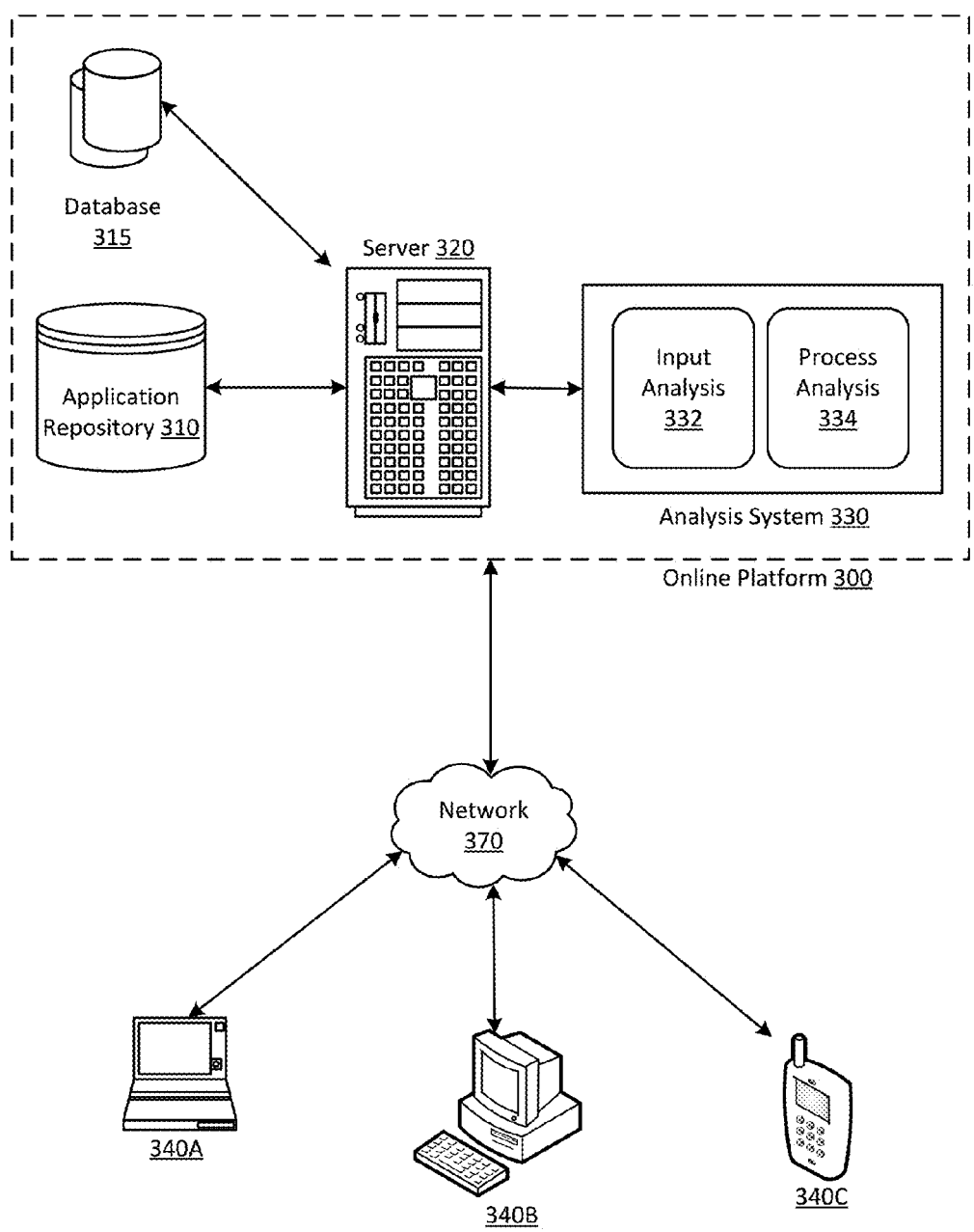
FIG. 3 is a flowchart of one embodiment of a user feedback mechanism.

FIG. 3 illustrates an example where user feedback information may be used in a networked multi-user computing environment. The computing environment may include an online platform 300 that may include an application repository 310, a server 320, and an analysis system 330. The online platform 300 allows consumers, via their computing devices 340A-340C, to view and access online services and applications that are offered by an online service provider. Application repository 310 may be communicatively coupled to online server 320. Online server 320 may provide an interface for each of the devices 340A-340C. The application repository 310 may include software or other services that may be offered for a price or for other arrangements.

The computing environment may include client devices 340A-340C. Customers may use the client devices 340A-340C to access online services provided by the online service provider. The client devices 340A-340C may each be configured with user input analysis function 160 to generate user state information and to send the data to the online platform 300 via network 370. The network 370 may be a Local Area Network (LAN), a larger network, such as a Wide Area Network (WAN), or a collection of networks, such as the Internet.

The online platform 300 may include an analysis system 370 that may further include, for example, user input analysis function 332 and the user input processing function 334. User input analysis function 332 and user input process analysis function 334 may be used to analyze received user state information received from client devices 340A-340C and determine responses for applications and services being provided to the client devices 340A-340C. In another embodiment, the user input analysis function 332 and user input process analysis function 334 may be configured to receive raw input data from client devices 340A-340C and determine user states without the need to receive user states from the client devices 340A-340C.

Additionally and optionally, a database 315 may be provided that may be used to store user state information as well as mappings to user states.

It should be appreciated that the network topology illustrated in FIG. 3 has been simplified and that many more networks and networking devices may be utilized to interconnect the various computing systems disclosed herein. These network topologies and devices should be apparent to those skilled in the art.

It should also be appreciated that online platform 300 described in FIG. 3 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 4:
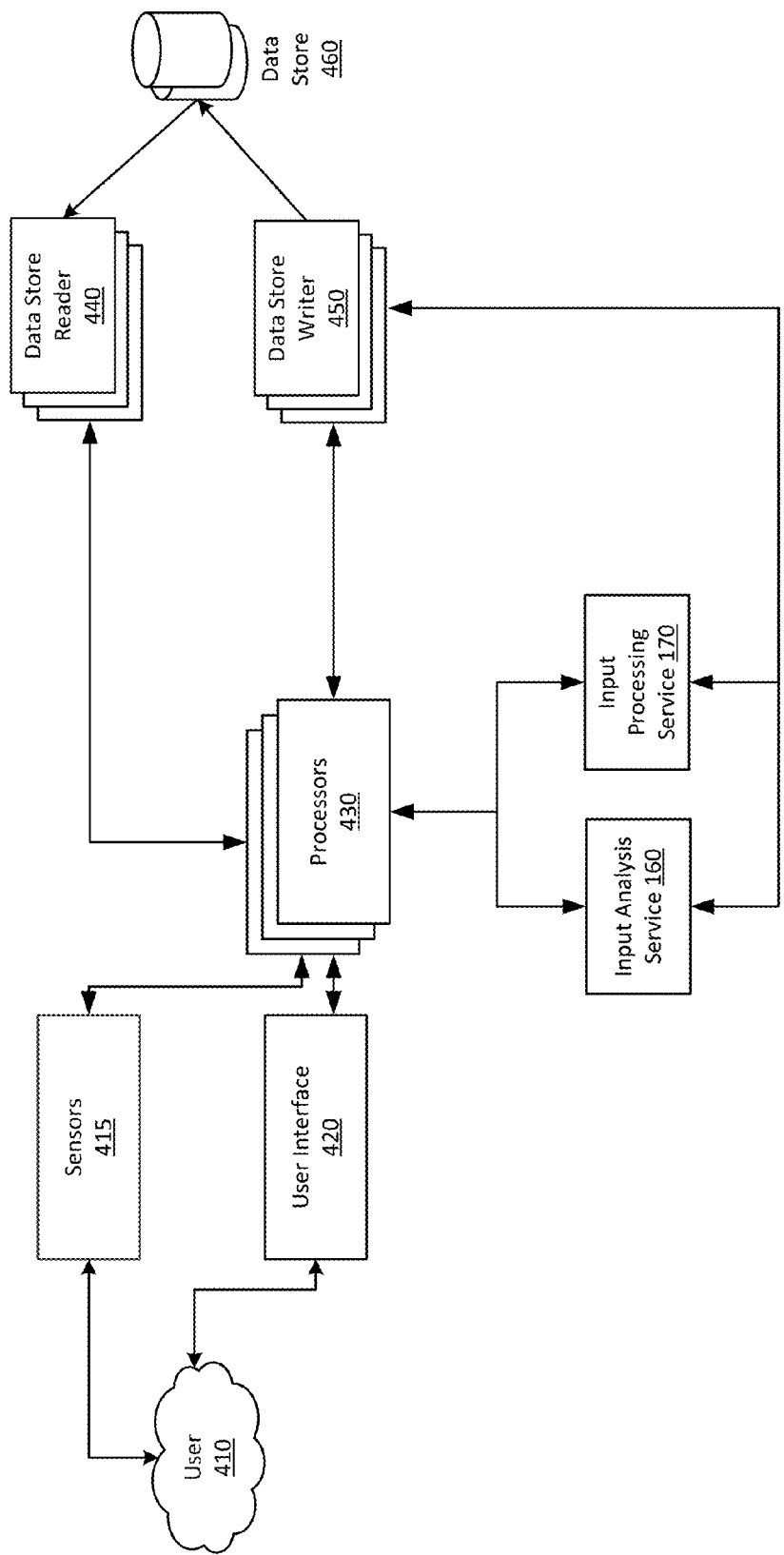
FIG. 4 illustrates a block diagram depicting one embodiment of an augmented reality system.

Referring to FIG. 4, illustrated is one example implementation of functionality associated with a user feedback mechanism on a computing device. A user 410 of a computing device may interact directly with a user interface 420 of the computing device. Sensor input data may also be collected either directly or indirectly from a user via one or more sensors 415 that are coupled to the computing device. The data from sensors 415 and user interface 420 may be collected by one or more processors 430 of the computing device. The processors 430 may execute input analysis service 160 and input processing service 170 as described herein. The sensor data and user interface data, as well as data that is generated by input analysis service 160 and input processing service 170, can be provided to a data store writer 450 that may store the data in data store 460. A data store reader 420 may be configured to access the data store 460 and retrieve data based on requests from processors 430 for use by various applications running on the computing device or sending to other services via a network.

Figure 5:
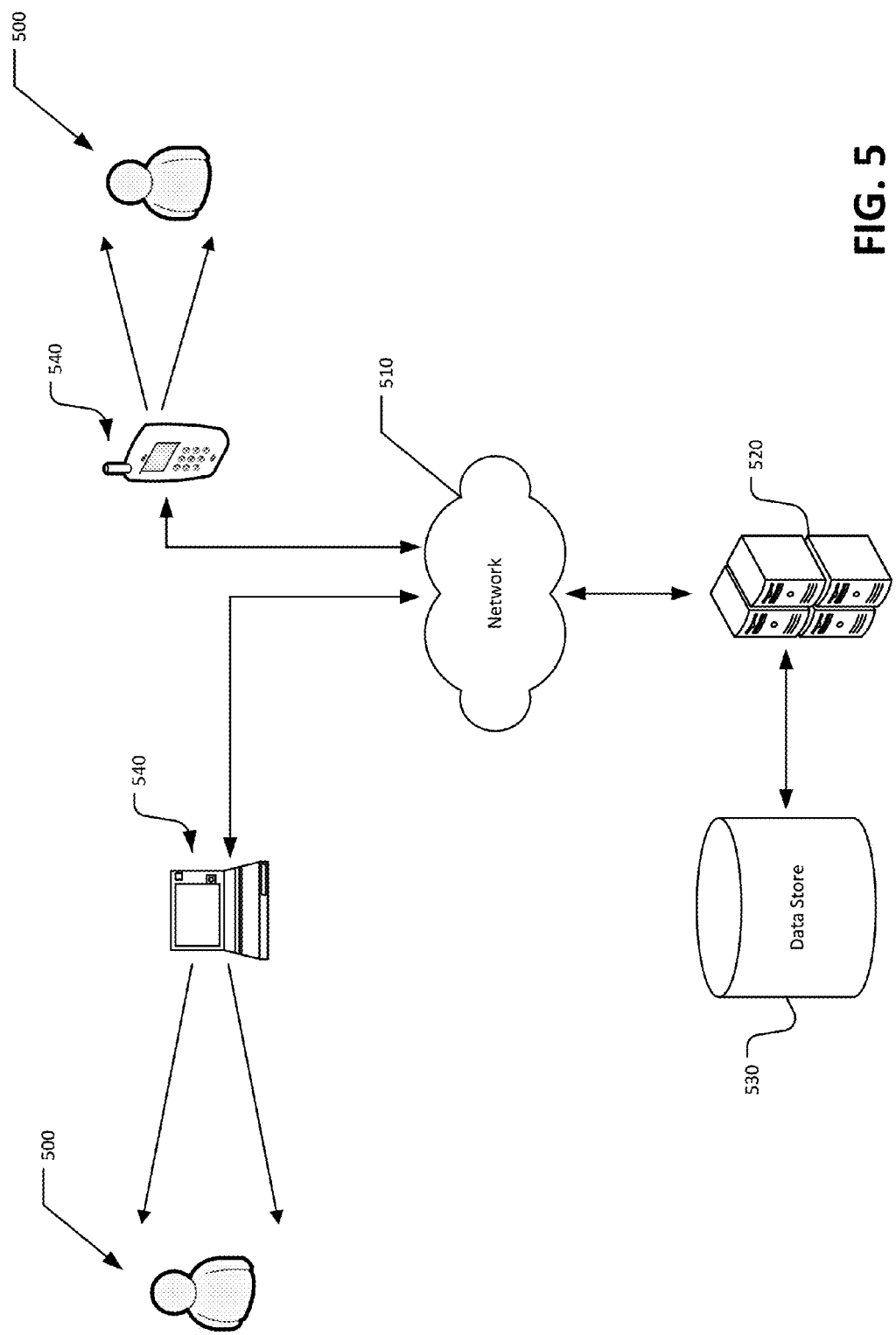
FIG. 5 illustrates an example user feedback mechanism.

Referring to FIG. 5, illustrated is one example implementation where multiple users 500 using devices 540 may provide user feedback data in a networked environment. User feedback information may be collected by computing devices 540 for respective users 500. The devices 540 may be communicatively coupled to servers 520 via a network 510. For example, users 500 may be accessing online services provided by applications running on servers 520. Servers 520 may use the user feedback data to modify the services being provided to the users 500. For example, if the online service is an online game application, the execution of the online game may incorporate the user feedback to modify and enhance the game experience. The user feedback data may also be used to provide feedback from online players to the users 500. Servers 520 may also store the user feedback data in a data store 530 for continued processing as well as use in future interactions with the users 500.

Figure 6:
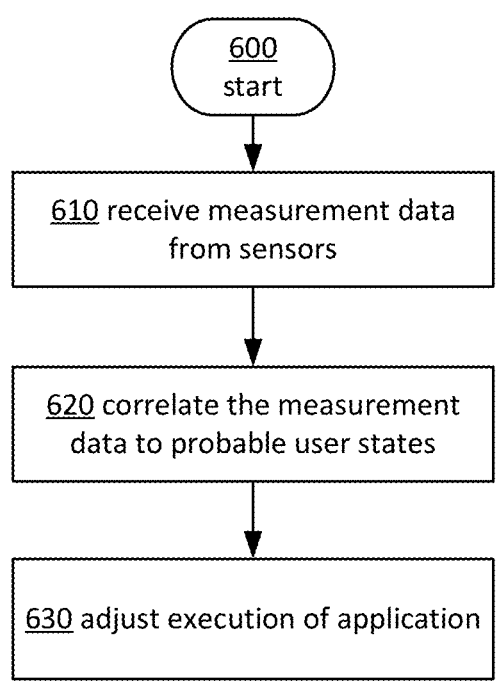
FIG. 6 illustrates an example user feedback mechanism.

FIG. 6 illustrates an example operational procedure for controlling a computing device. In an embodiment, aspects of the operational procedure may be implemented by provided by services, such as user input analysis function 160 and user input processing function 170 in FIG. 1. The operational procedure may be implemented on a computing device such as the computing device depicted in FIG. 8 below. Referring to FIG. 6, operation 600 begins the operational procedure. Operation 600 may be followed by operation 610. Operation 610 illustrates receiving measurement data from at least two sensors communicatively coupled to the computing device during execution of at least one game application on the computing device. The measurement data may be associated with actions of a user of the computing device and actions that are not provided as an input by the user.

Operation 610 may be followed by operation 620. Operation 620 illustrates correlating the measurement data to one or more probable user states based at least in part on analysis of the measurement data. In an embodiment, the probable user states may be indicative of a level or type of interaction of the user with the computing device. Operation 620 may be followed by operation 630. Operation 630 illustrates adjusting aspects of the execution of the game application based on the probable user states. In some embodiments, the probable user states may be made available via an application programming interface (API) to requesting processes of the computing device. Furthermore, a speed of game play of the game application may be altered.

In some embodiments, aspects of an executing application that are modified may include modification of the rendering of the user interface associated with the application. For example, the brightness and color scheme of a user interface may be modified in response to the probable user states. As another example, the speed with which an interactive application is executed may be altered based on the probable user states. In one embodiment, the probable user states may be associated with factors for speed of execution and a user interface design scheme. For example, the user states may include three possible "stress" levels or states: low stress, medium stress, and high stress. Each of these stress states may be associated with a speed factor and a design scheme factor. For example, the user states and factors may be implemented as follows:

| User state | Speed Factor | Design Factor |
| --- | --- | --- |
| Low stress | A = normal, dampen sudden increases by 20% | Standard color scheme; 70% brightness |
| Medium stress | B = normal | Standard color scheme; 80% brightness |
| High stress | C = decrease by 10% | Color scheme "A"; 100% brightness |

Some user states may have multiple possible values or may allow any value within a range of values. In some embodiments the user states may be correlated to aspects of an application using an algorithm rather than a discrete set of values. For example, if the user state is a distance of the user's face from the computing device and the aspect is the brightness of the screen of the computing device, then the brightness of the screen may be set as $B=D^2*1/k$, where k is a factor determined by the application type.

Figure 7:
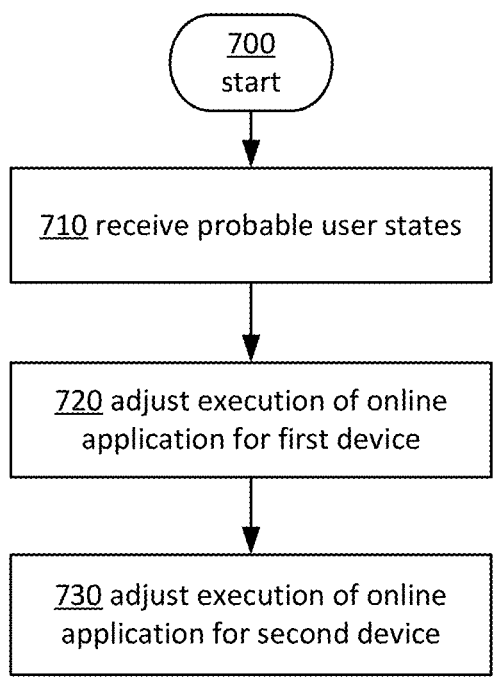
FIG. 7 illustrates a computing device that can be used to implement some of the features described herein.

FIG. 7 illustrates an example operational procedure for controlling a computing device. In an embodiment, aspects of the operational procedure may be implemented by provided by services, such as user input analysis function 170 and user input processing function 170 in FIG. 1. The operational procedure may be implemented on a computing device such as the computing device depicted in FIG. 8 below. Referring to FIG. 7, operation 700 begins the operational procedure. Operation 700 may be followed by operation 710. Operation 710 illustrates receiving one or more probable user states for a user of the first computing device during execution of at least one online application with a first computing device. The probable user states may be made available via an application programming interface (API) for requesting the user states. In one embodiment, the probable user states may be indicative of a level or type of interaction of the user with the first computing device. Additionally, the probable user states may be determined based at least in part on analysis of measurement data received from one or more sensors communicatively coupled to the first computing device. In some embodiments, the measurement data may be indicative of indirect and non-visual input of the user. Furthermore, the measurement data may be associated with a user of the first computing device.

Operation 710 may be followed by operation 720. Operation 720 illustrates adjusting one or more aspects of the execution of the at least one online application with the first computing device based on the probable user states. Operation 720 may be followed by operation 730. Operation 730 illustrates adjusting one or more aspects of execution of the at least one online application with a second computing device based on the probable user states.

Figure 8:
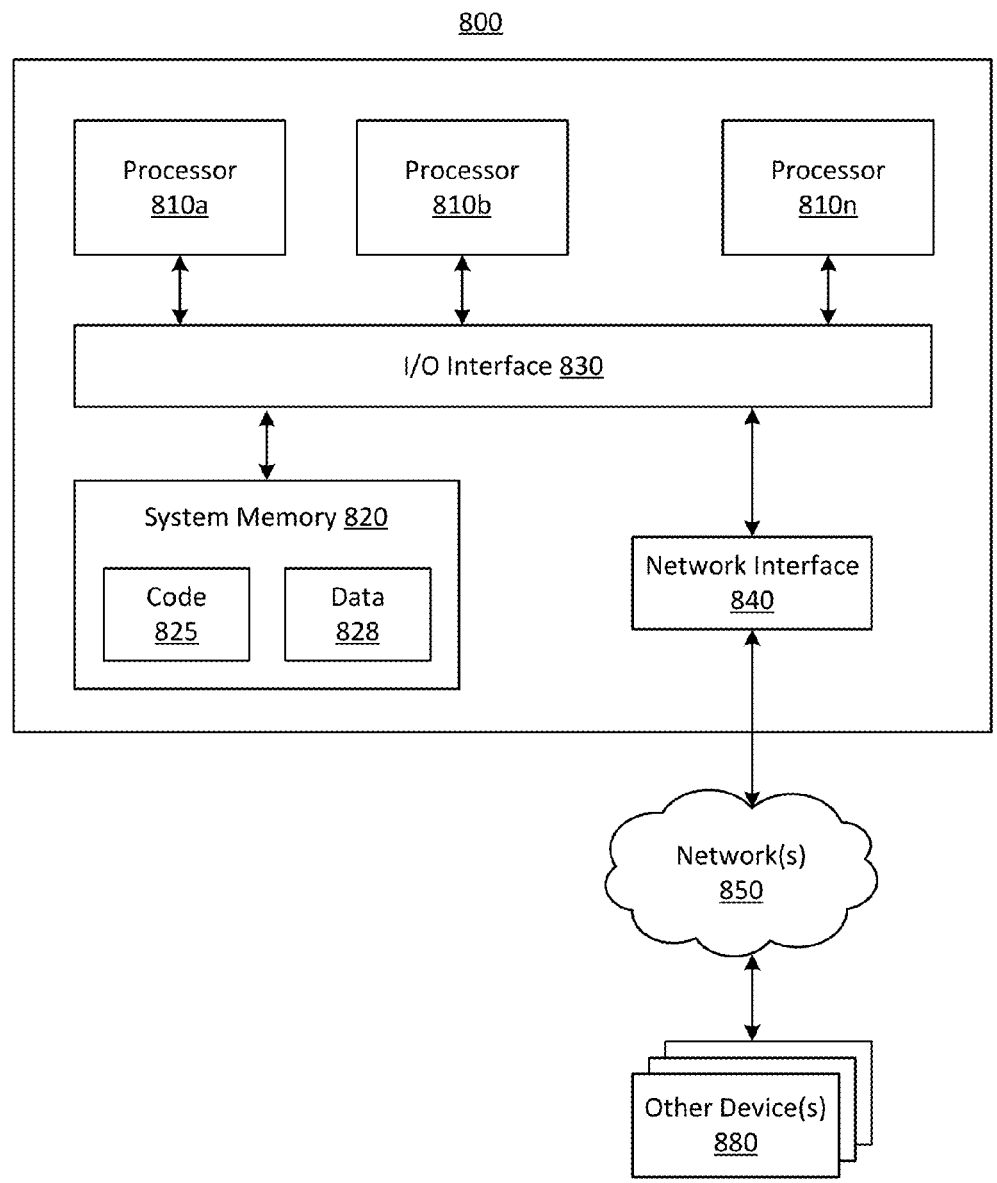
FIG. 8 illustrates an example computing environment in which embodiments of the present disclosure may be implemented.

In at least some embodiments, a computing device that implements a portion or all of one or more of the technologies described herein, may include a general-purpose computer system that includes or is configured to access one or more computer-accessible media. FIG. 8 illustrates such a general-purpose computing device 800. In the illustrated embodiment, computing device 800 includes one or more processors 810a, 810b, and/or 810n (which may be referred herein singularly as "a processor 810" or in the plural as "the processors 810") coupled to a system memory 820 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 310 may be general purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or network(s) 850, such as other computer systems or devices as illustrated in FIGS. 1-7, for example. In various embodiments, network interface 840 may support communication via any suitable wired or wireless general data networks, such as types of Ethernet networks, for example. Additionally, network interface 840 may support communication via telecommunications/telephony networks, such as analog voice networks or digital fiber communications networks, via storage area networks, such as Fibre Channel SANs or via any other suitable type of network and/or protocol.

In some embodiments, system memory 820 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special purpose computer systems, in addition to or instead of being implemented using general purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

It will be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

What is claimed is:

1. A computer-implemented method for controlling a computing device, the method comprising:
    during execution of at least one game application on the computing device, receiving measurement data from at least two sensors communicatively coupled to the computing device, the measurement data associated with actions of a user of the computing device and that are not directly provided as an input by the user;
    correlating the measurement data to a plurality of probable user states associated with different respective levels of stress based at least in part on analysis of the measurement data, wherein the plurality of probable user states are indicative of a level or type of interaction of the user with the computing device; and
    adjusting one or more aspects of the execution of the at least one game application based at least in part on the plurality of probable user states, wherein a plurality of factors for the one or more aspects are associated with the plurality of probable user states.

2. The method according to claim 1, wherein the plurality of probable user states include one or more of a postural engagement of the user with the computing device or an attention level of the user with the computing device.

3. The method according to claim 2, wherein the adjusting further comprises modifying a user interface rendered on the computing device.

4. The method according to claim 1, wherein the measurement data is indicative of a facial position of the user.

5. The method according to claim 1, wherein the measurement data is indicative of biometric information associated with the user.

6. The method according to claim 1, wherein the measurement data comprises audio data indicative of non-verbal vocal sounds of the user.

7. A computing device comprising:
    one or more processors; and
    at least one memory having stored therein computer instructions that, upon execution by the one or more processors, at least cause the computing device to:
        receive, from one or more sensors during the execution of an application, measurement data indicative of one or more collateral actions of a user;
        correlate the measurement data to a plurality of probable user states associated with different respective levels of stress; and
        alter execution of at least one aspect of the application based at least in part on the plurality of probable user states, wherein a plurality of factors for the at least one aspect are associated with the plurality of probable user states.

8. The computing device of claim 7, wherein the measurement data is indicative of a pitch, roll, or yaw of the computing device.

9. The computing device according to claim 7, further comprising computer instructions that, upon execution by the one or more processors, at least cause the computing device to receive additional measurement data indicative of collateral actions of an additional user, correlate the additional measurement data of the additional user to one or more probable user states of the additional user, and alter execution of the application based on the one or more probable user states of the additional user.

10. The computing device according to claim 7, wherein the plurality of probable user states are indicative of at least one of a level or type of interaction of the user with the computing device.

11. The computing device according to claim 7, wherein the at least one aspect comprises a speed of play of the application.

12. The computing device according to claim 7, wherein the application is a video game application.

13. The computing device according to claim 7, wherein the measurement data is correlated based on a weighted combination of inputs.

14. The computing device according to claim 7, wherein the measurement data includes one or more of accelerometer data or gyroscope data, and wherein the plurality of probable user states include a postural engagement of the user with the computing device.

15. The computing device according to claim 7, wherein the measurement data comprises audio data indicative of non-verbal vocal sounds of the user, and wherein the plurality of probable user states include a current interactive state of the user with the computing device.

16. The computing device according to claim 7, wherein a first aspect of the at least one aspects comprises a level of difficulty of the application.

17. A computer-implemented method for processing user feedback, the method comprising:

during execution of at least one online application with a first computing device, receiving a plurality of probable user states for a user of the first computing device, the plurality of probable user states made available via an application programming interface (API) for requesting the plurality of probable user states, wherein:

the plurality of probable user states are associated with different respective levels of stress;

the plurality of probable user states are determined based at least in part on analysis of measurement data received from one or more sensors communicatively coupled to the first computing device; and adjusting one or more first aspects of the execution of the at least one online application with respect to the first computing device based at least in part on the plurality of probable user states, wherein a plurality of factors for the one or more first aspects are associated with the plurality of probable user states.

18. The method according to claim 17, further comprising adjusting one or more second aspects of the execution of the at least one online application with respect to a second computing device based on the plurality of probable user states.

19. The method according to claim 18, further comprising providing an indication of the plurality of probable user states to the second computing device.

20. The method according to claim 18, further comprising adjusting one or more second aspects of the execution of the at least one online application with respect to the first computing device based on probable user states for a user associated with the second computing device.

* * * * *